(12) United States Patent
Bernreitner et al.

(10) Patent No.: US 8,637,625 B2
(45) Date of Patent: Jan. 28, 2014

(54) PROPYLENE-BUTENE RANDOM COPOLYMER PRODUCED IN THE PRESENCE OF A METALLOCENE CATALYST

(75) Inventors: Klaus Bernreitner, Linz (AT); Manfred Stadlbauer, Nuremberg (DE); Norbert Hafner, Linz (AT); Wilfried Töltsch, Marchtrenk (AT)

(73) Assignee: Borealis AG, Vienna (AT)

( * ) Notice: Subject to any disclaimer, the term of this patent is extended or adjusted under 35 U.S.C. 154(b) by 121 days.

(21) Appl. No.: 12/998,676

(22) PCT Filed: Nov. 16, 2009

(86) PCT No.: PCT/EP2009/065193
§ 371 (c)(1),
(2), (4) Date: Jun. 27, 2011

(87) PCT Pub. No.: WO2010/057841
PCT Pub. Date: May 27, 2010

(65) Prior Publication Data
US 2011/0293867 A1    Dec. 1, 2011

(30) Foreign Application Priority Data
Nov. 18, 2008 (EP) ................................... 08169376

(51) Int. Cl.
*C08F 210/06* (2006.01)
*C08F 210/08* (2006.01)
*F16L 9/12* (2006.01)

(52) U.S. Cl.
USPC .................... 526/348; 526/348.6; 138/178

(58) Field of Classification Search
USPC ............... 526/348.6, 351, 348; 428/36.9
See application file for complete search history.

(56) References Cited

U.S. PATENT DOCUMENTS

| | | | | |
|---|---|---|---|---|
| 6,518,386 | B1 * | 2/2003 | Resconi et al. | 526/351 |
| 8,304,049 | B2 * | 11/2012 | Machl et al. | 428/36.9 |
| 2005/0053741 | A1 * | 3/2005 | Ebner et al. | 428/36.91 |
| 2010/0151172 | A1 * | 6/2010 | Emig et al. | 428/36.9 |

FOREIGN PATENT DOCUMENTS

| | | |
|---|---|---|
| CN | 1355256 A | 6/2002 |
| CN | 102216348 A | 10/2011 |
| EP | 0 517 868 | 11/1995 |
| EP | 0 887 379 | 12/1998 |
| EP | 1 312 623 | 5/2003 |
| WO | 9622995 A1 | 8/1996 |
| WO | WO 03/042260 | 5/2003 |
| WO | WO 2005/040271 | 5/2005 |
| WO | WO 2006/002778 | 1/2006 |
| WO | WO 2007/045418 | 4/2007 |
| WO | 2008122445 A1 | 10/2008 |
| WO | WO 2008/122445 | 10/2008 |
| WO | WO 2008/122445 A1 * 10/2008 ............ C08F 210/06 |
| WO | 2010057840 A1 | 5/2010 |

OTHER PUBLICATIONS

Baker et al.; "Conformation of Ethylene/Propylene Copolymers (Random or Block) As Seen by 13C NMR, IR and Thermal Methods"; Thermochimica Acta, 166 (1990) pp. 53-68; Elsevier Science Publishers B.V., Amsterdam.

Hayashi et al.; "Heptad Configurational Analysis of 13C N.M.R. Spectra in Highly Isotactic Polypropylene"; Polymer, vol. 29; Jan. 1988; pp. 138-143; Butterworth & Co. (Publishers) Ltd.

Chujo et al.; "Two-Site Model Analysis of 13C N.M.R. of Polypropylene Polymerized by Ziegler-Natta Catalyst With External Alkoxysilane Donors"; Polymer, 1994, vol. 35, No. 2; pp. 339-342; Butterworth-Heinemann (Publishers) Ltd.

Turner Jones et al.; "Crystalline Forms of Isotactice Polypropylene"; Imperial Chemical Industries Limited, Welwyn Garden City, Herts., England; Oct. 1963; pp. 134-158.

\* cited by examiner

*Primary Examiner* — Rip A. Lee
(74) *Attorney, Agent, or Firm* — Warn Partners, P.C.

(57) ABSTRACT

Propylene copolymer (a) comprising at least 1-butene as a comonomer, (b) having a comonomer content in the range of 1.0 to 3.0 wt.-%, (c) having a xylene soluble fraction equal or below 2.5 wt.-%, and (d) being partially crystallized in the β-modification.

15 Claims, No Drawings

PROPYLENE-BUTENE RANDOM COPOLYMER PRODUCED IN THE PRESENCE OF A METALLOCENE CATALYST

This application is a National Stage of International Application No. PCT/EP2009/065193, filed Nov. 16, 2009. This application claims priority to European Patent Application No. 08169376.4 filed on Nov. 18, 2008. The disclosures of the above applications are incorporated herein by reference.

The present invention relates to a propylene/1-butene copolymer, a method for its preparation, and its use for pipes, in particular pressure pipes.

Polymer materials are frequently used for the preparation of pipes for various purposes, such as fluid transport, e.g. water or natural gas. The transported fluid may be pressurized and have varying temperature, usually within the range of about 0° C. to about 70° C. Such pipes are typically made of polyolefins. Because of the high temperatures involved, hot water pipes made from polyolefins have to meet specific requirements. The temperature in a hot water pipe might range from 30° C. to 70° C. However, peak temperature can be up to 100° C. To secure long term use, the selected pipe material must be able to withstand a temperature exceeding the range mentioned above, According to the standard DIN 8078, a hot water pipe made of propylene homo- or copolymer must have a run time of at least 1000 h without failure at 95° C. and a pressure of 3.5 MPa.

Due to its high thermal resistance, if compared to other polyolefins, polypropylene is particularly useful for applications at increased temperature, such as hot water pipes. However, besides thermal resistance, a polypropylene useful for pipe applications needs to have high stiffness in combination with high resistance to slow crack growth.

There are two different cracking modes of polypropylene pipes: ductile or brittle failure.

Ductile failure is associated with macroscopic yielding, i.e. there is a large material pull out adjacent to the location of failure.

However, the majority of cracking taking place in polypropylene pipes is of brittle type and does not exhibit large deformation. Brittle failure usually occurs under low stress and takes a long time to propagate through the material via the process of slow crack growth. Such type of failure is the least-desirable since it is difficult to detect at an early stage.

Thus, for any polypropylene being useful for pipe applications, in particular pressure pipe applications, it is desired to have a beneficial compromise between high resistance to slow crack growth, thermal resistance, rigidity, and impact strength. However, quite frequently it turns out that one of these properties can only be achieved on the expense of the other properties.

Pipes made of propylene homopolymer show high thermal resistance in combination with high rigidity whereas resistance to slow crack growth is lowered. Slow crack growth properties can be improved by using propylene copolymers. However, the incorporation of comonomers into the polypropylene chain has a detrimental impact on thermal resistance and rigidity, an effect that needs to be compensated by mixing with an additional propylene homopolymer component. Furthermore, the higher the comonomer content, the higher is the risk that polymeric material is washed out by the transport fluid.

WO 2005/040271 A1 discloses a pressure pipe comprising a resin formed from (i) a random copolymer comprising units of propylene and a C2 to C10 alpha-olefin, and (ii) a propylene-ethylene elastomer.

WO 2006/002778 A1 discloses a pipe system having at least one layer comprising a semi-crystalline random copolymer of propylene and 1-butene. The copolymer exhibits a broad monomodal molecular weight distribution and has a rather high xylene solubles content.

WO 03/042260 discloses a pressure pipe made from a propylene copolymer which is at least partially crystallized in the β-modification.

Considering the requirements of pressure pipe materials discussed above, it is an object of the present invention to provide a polypropylene having a high resistance to slow crack propagation while still keeping thermal resistance and rigidity on a high level. Furthermore, it is desired to minimize the potential risk of washing out polymeric material from the pipe by the pressurized fluid.

The finding of the present invention is to provide a β-nucleated propylene 1-butene copolymer with low amounts of xylene solubles.

Thus the object outlined above is in particular solved by a propylene copolymer (A)
(a) comprising at least 1-butene as a comonomer,
(b) having a comonomer content in the range of 1.0 to 3.0 wt.-%,
(c) having a xylene soluble fraction (XCS) equal or below 2.5 wt.-%, more preferably having a xylene soluble fraction (XCS) equal or below 1.5 wt.-%, like equal or below 1.0 wt.-%, and
(d) being partially crystallized in the β-modification.

Preferably the propylene copolymer (A) comprises a β-nucleating agent (B). Even more preferably the propylene copolymer (A) has a polydispersity index (PI) of equal or below 4.0 $Pa^{-1}$, yet more preferably equal or below 3.5 $Pa^{-1}$, still more preferably equal or below 2.9 $Pa^{-1}$, like equal or below 2.7 $Pa^{-1}$. Still more preferably the propylene copolymer (A) is featured by the fact that the part of the propylene copolymer (A)
(i) crystallized in the α-modification has a melting temperature below 150° C., more preferably below 148° C. and/or
(ii) crystallized in the β-modification has a melting temperature below 138° C., more preferably below 136° C.

Yet more preferably the propylene copolymer (A) according to this invention fulfils the equation $$\frac{[XCS]}{[C]} < 1.0, \quad (I.1)$$

preferably $$\frac{[XCS]}{[C]} < 0.9, \quad (I.2)$$

more preferably $$\frac{[XCS]}{[C]} < 0.8 \quad (I.3)$$

wherein
[XCS] is the amount of xylene soluble fraction (XCS) of the propylene copolymer (A) given in weight percent, and
[C] is the amount of comonomer of the propylene copolymer (A) in weight percent.

Surprisingly it has been found out that with the propylene copolymer (A) according to the invention pipes are obtainable having superior slow crack propagation performance compared to pipes being state of the art. Moreover not only the slow crack propagation performance of the pipes based on the inventive propylene copolymer (A) according to the invention is outstanding but additionally also the stiffness and the impact performance of the pipe and of the propylene copolymer (A) are excellent. In particular the Izod impact resistance at low temperatures and the flexural modulus are above average (compare table 2).

In the following the invention is described in more detail.

One important requirement of the present invention is that the propylene copolymer (A) has a rather low xylene cold soluble fraction (XCS).

Xylene solubles are the part of the polymer soluble in cold xylene determined by dissolution in boiling xylene and letting the insoluble part crystallize from the cooling solution (for the method see below in the experimental part). The xylene solubles fraction contains polymer chains of low stereo-regularity and is an indication for the amount of non-crystalline areas.

Accordingly it is preferred that the xylene cold soluble fraction (XCS) of the inventive propylene copolymer (A) is equal or less than 2.5 wt.-%, more preferably less than 2.0 wt.-%, still more preferably less than 1.5 wt.-%, yet more preferably less than 1.0 wt.-%. In preferred embodiments the xylene cold soluble fraction (XCS) are in the range of 0.1 to 1.5 wt.-% and more preferably in the range of 0.1 to 1.0 wt.-%.

As further requirement of the present invention is the inventive propylene copolymer (A) must be β-nucleated, i.e. the propylene copolymer (A) must be partially crystallized in the β-modification. Thus it is preferred that the amount of β-modification of the propylene copolymer (A) is at least 50%, more preferably at least 60%, still more preferably at least 65%, yet more preferably at least 70%, still yet more preferably at least 80%, like about 90% (determined by DSC using the second heat as described in detail in the example section).

Of course the propylene copolymer (A) may also comprise β-nucleating agents (B). As β-nucleating agent (B) any nucleating agent can be used which is suitable for inducing crystallization of the propylene copolymer (A) in the hexagonal or pseudo-hexagonal modification. Preferred β-nucleating agents (B) are those listed below, which also includes their mixtures.

Suitable types of β-nucleating agents (B) are
dicarboxylic acid derivative type diamide compounds from $C_5$ to $C_8$-cycloalkyl monoamines or $C_6$ to $C_{12}$-aromatic monoamines and $C_5$ to $C_8$-aliphatic, $C_5$ to $C_8$-cycloaliphatic or $C_6$ to $C_{12}$-aromatic dicarboxylic acids, e.g.
N,N'-di-$C_5$-$C_8$-cycloalkyl-2,6-naphthalene dicarboxamide compounds such as N,N'-dicyclohexyl-2,6-naphthalene dicarboxamide and N,N'-dicyclooctyl-2,6-naphthalene dicarboxamide,
N,N-di-$C_5$-$C_8$-cycloalkyl-4,4-biphenyldicarboxamide compounds such as N, N'-dicyclohexyl-4,4-biphenyldicarboxamide and N,N'-dicyclopentyl-4,4-biphenyldicarboxamide,
N,N'-di-$C_5$-$C_8$-cycloalkyl-terephthalamide compounds such as N,N'-dicyclohexylterephthalamide and N,N'-dicyclopentylterephthalamide,
N,N'-di-$C_5$-$C_8$-cycloalkyl-1,4-cyclohexanedicarboxamide compounds such as N,N'-dicyclo-hexyl-1,4-cyclohexanedicarboxamide and N,N'-dicyclohexyl-1,4-cyclopentanedicarboxamide,
diamine derivative type diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines, e.g.
N,N—$C_6$-$C_{12}$-arylene-bis-benzamide compounds such as N,N'-p-phenylene-bis-benzamide and N,N'-1,5-naphthalene-bis-benzamide,
N,N'—$C_5$-$C_8$-cycloalkyl-bis-benzamide compounds such as N,N'-1,4-cyclopentane-bis-benzamide and N,N'-1,4-cyclohexane-bis-benzamide,
N,N-p-$C_6$-$C_{12}$-arylene-bis-$C_5$-$C_8$-cycloalkylcarboxamide compounds such as N,N'-1,5-naphthalene-bis-cyclohexanecarboxamide and N,N'-1,4-phenylene-bis-cyclohexanecarboxamide, and
N,N'—$C_5$-$C_8$-cycloalkyl-bis-cyclohexanecarboxamide compounds such as N,N'-1,4-cyclopentane-bis-cyclohexanecarboxamide and N,N'-1,4-cyclohexane-bis-cyclohexanecarboxamide,
amino acid derivative type diamide compounds from amidation reaction of $C_5$-$C_8$-alkyl, $C_5$-$C_8$-cycloalkyl- or $C_6$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic mono-amines, e.g.
N-phenyl-5-(N-benzoylamino)pentaneamide and N-cyclohexyl-4-(N-cyclohexyl-carbonylamino)benzamide.

Further suitable of β-nucleating agents (B) are
quinacridone type compounds, e.g.
quinacridone, dimethylquinacridone and dimethoxyquinacridone,
quinacridonequinone type compounds, e.g.
quinacridonequinone, a mixed crystal of 5,12-dihydro (2,3b)acridine-7,14-dione with quino(2,3b)acridine-6,7,13,14-(5H, 12H)-tetrone and dimethoxyquinacridonequinone and
dihydroquinacridone type compounds, e.g.
dihydroquinacridone, dimethoxydihydroquinacridone and dibenzodihydroquinacridone.

Still further suitable β-nucleating agents (B) are
dicarboxylic acid salts of metals from group IIa of periodic system, e.g. pimelic acid calcium salt and suberic acid calcium salt; and
mixtures of dicarboxylic acids and salts of metals from group IIa of periodic system.

Still further suitable β-nucleating agents (B) are
salts of metals from group IIa of periodic system and imido acids of the formula

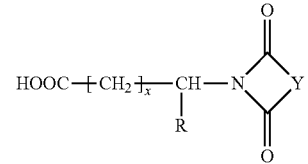

wherein x=1 to 4; R=H, —COOH, $C_1$-$C_{12}$-alkyl, $C_5$-$C_8$-cycloalkyl or $C_6$-$C_{12}$-aryl, and Y=$C_1$-$C_{12}$-alkyl, $C_5$-$C_8$-cycloalkyl or $C_6$-$C_{12}$-aryl-substituted bivalent $C_6$-$C_{12}$-aromatic residues, e.g.
calcium salts of phthaloylglycine, hexahydrophthaloylglycine, N-phthaloylalanine and/or N-4-methylphthaloylglycine.

Preferred β-nucleating agents (B) are any one or mixtures of N,N'-dicyclohexyl-2,6-naphthalene dicarboxamide, quinacridone type or pimelic acid calcium-salt (EP 0 682 066).

The amount of β-nucleating agents (B) within the propylene copolymer (A) is preferably up to 2.0 wt.-%, more preferably up to 1.5 wt.-%, like 1.0 wt.-%. Thus it is appreciated that the β-nucleating agents (B) are present within the propylene copolymer (A) from 0.0001 to 2.0000 wt.-%, more preferably from 0.005 to 0.5000 wt.-%.

In this context it is mentioned that the polypropylene copolymer (A) may comprise additives as usual in the art. However, the polypropylene copolymer (A) does not comprise further other polymer types. Thus the propylene copolymer (A) can be seen as a composition of said propylene polymer (A) and the β-nucleating agents (B) and optionally further additives, but without other polymers.

Accordingly the propylene polymer (A) may comprise up to 10 wt.-% additives, which includes the mandatory β-nucleating agents (B) but optionally also fillers and/or stabilizers and/or processing aids and/or antistatic agents and/or pigments and/or reinforcing agents.

Further it is mandatory that the polypropylene copolymer (A) comprises at least 1-butene as comonomer.

However, the propylene copolymer (A) may comprise further α-olefin(s), like C2, C5 to C10 α-olefin(s). In such a case ethylene is in particular preferred. Thus in one preferred embodiment the propylene copolymer (A) is a terpolymer comprising propylene, 1-butene and ethylene. However, it is more preferred that the propylene copolymer (A) does not comprise further comonomer(s), i.e. 1-butene is the only comonomer of the propylene copolymer (A) (binary propylene-butene copolymer).

Thus the binary propylene-1-butene copolymer is particularly preferred.

More preferably the above defined propylene copolymer (A) is a random copolymer. Thus a random propylene copolymer according to the present invention is a random propylene copolymer produced by statistical insertion of units of 1-butene (if present with units of ethylene or a C5 to C10 α-olefin, preferably ethylene, to give a random terpolymer). The Randomness indicates the amount of isolated comonomer units, i.e. those which have no other comonomer units in the neighbour, compared to the total amount of comonomers in the polymer chain. In a preferred embodiment, the randomness of the propylene copolymer (A) is at least 30%, more preferably at least 50%, even more preferably at least 60%, and still more preferably at least 65%.

The type of comonomer has a significant influence on a number of properties like crystallization behaviour, stiffness, melting point or flowability of the polymer melt. Thus to solve the objects of the present invention, in particular to provide an improved balance between stiffness, impact resistance and slow crack propagation performance it is necessary that the propylene copolymer comprises 1-butene as a comonomer at least in a detectable manner, in particular of at least 1.0 wt.-%. On the other hand the increase of the comonomer content, in particular of 1-butene, in the propylene copolymer (A) may drop the stiffness.

Thus, it is appreciated that the propylene copolymer (A) comprises preferably not more than up to 3.0 wt.-% comonomer, in particular 1-butene, based on the weight of the propylene copolymer (A). As stated above the comonomer 1-butene is mandatory whereas other α-olefins can be additionally present. However the amount of additional α-olefins shall preferably not exceed the amount of 1-butene in the propylene copolymer (A). More preferably the amount of comonomer, in particular of 1-butene, within the propylene copolymer is equal or below 2.2 wt.-%, still more preferably equal or below 2.0 wt.-% and yet more preferably equal or below 1.8 wt.-%. Accordingly the amount of comonomer, in particular 1-butene, within the propylene copolymer (A) is from 1.0 to 3.0 wt.-%, more preferably from 1.0 to 2.2 wt.-%, still more preferably from 1.0 to 2.0 wt.-%, yet more preferably of 1.0 to 1.9 wt.-%, yet still more preferably of 1.0 to 1.8 wt.-%. In a particular preferred embodiment the amount of comonomer, in particular 1-butene, is 1.0 to 1.8 wt.-%, more preferred 1.1 to 1.6 wt.-%.

In case the propylene copolymer (A) is a binary propylene-1-butene copolymer—an embodiment which is particularly preferred—the ranges as defined in the previous paragraph refer to 1-butene only.

The comonomer content of the propylene copolymer (A) can be determined with FT infrared spectroscopy, as described below in the examples.

One remarkable improvement in the present invention is that comonomers, like 1-butene, can be inserted in the propylene copolymer chain without significantly increasing the xylene cold soluble fraction (XCS), an undesired phenomena observed by propylene copolymers produced in the presence of a Ziegler-Natta catalyst.

Accordingly a particular finding is that the propylene copolymer (A) satisfies the formula $$\frac{[XCS]}{[C]} < 1.0, \quad (I.1)$$

preferably $$\frac{[XCS]}{[C]} < 0.9, \quad (I.2)$$

more preferably $$\frac{[XCS]}{[C]} < 0.8 \quad (I.3)$$

yet more preferably $$\frac{[XCS]}{[C]} < 0.75 \quad (I.4)$$

wherein

[XCS] is the amount of xylene soluble fraction (XCS) of the propylene copolymer (A) given in weight percent, and

[C] is the amount of comonomer of the propylene copolymer (A) in weight percent.

Additionally it is preferred that the propylene copolymer (A) is an isotactic propylene copolymer. Thus it is preferred that the propylene copolymer has a rather high pentad concentration, i.e. higher than 90%, more preferably higher than 92%, still more preferably higher than 95% and yet more preferably higher than 98%.

Further it is preferred that the propylene copolymer (A) is not chemically modified as it is known for instance from high melt strength polymers (HMS-polymer). Thus the propylene copolymer (A) is not cross-linked. The impact behaviour can normally also improved by using branched polypropylenes as for instance described in EP 0 787 750, i.e. single branched polypropylene types (Y-polypropylenes having a backbone with a single long side-chain and an architecture resembles a "Y"). Such polypropylenes are characterized by rather high melt strength. A parameter of the degree of branching is the branching index g'. The branching index g' correlates with the amount of branches of a polymer. The branching index g' is defined as $g'=[IV]_{br}/[IV]_{lin}$ in which g' is the branching index, $[IV]_{br}]$ is the intrinsic viscosity of the branched polypropylene and $[IV]_{lin}$ is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17, 1301 (1949). This document is herewith included by reference. Thus it is preferred that the branching index g' of the propylene copolymer (A) shall be at least 0.85, more preferably at least 0.90, yet more preferably at least 0.95, like 1.00.

A further essential aspect of the instant invention is that the propylene copolymer (A) has a rather low melting temperature compared to known Ziegler-Natta polypropylene counterparts. Accordingly the inventive propylene copolymer (A) is preferably further characterized in that the part of the propylene copolymer (A)

(i) crystallized in the α-modification has a melting temperature below 150° C., more preferably below 152° C., yet more preferably below 151° C. and/or
(ii) crystallized in the β-modification has a melting temperature below 141° C., more preferably below 140° C., yet more preferably below 139° C.

Accordingly it is in particular appreciated that the part of the propylene copolymer (A)

(i) crystallized in the α-modification has a melting temperature of 135 to 152° C., more preferably 138 to 151° C., yet more preferably 140 to 150° C. and/or
(ii) crystallized in the β-modification has a melting temperature 128 to 142° C., more preferably 130 to 141° C., yet more preferably 132 to 140° C.

The melting temperature of the part of the propylene copolymer (A) crystallized in the α-modification has a higher melting temperature compared to part of the propylene copolymer (A) crystallized the β-modification. The measuring method is defined in the example section.

It is further important requirement is that the propylene copolymer (A) must show a rather narrow molecular weight distribution (MWD).

The molecular weight distribution (MWD) can be measured by SEC (also known as GPC), whereby it is expressed as Mw/Mn, or by a rheological measurement, like Polydispersity Index (PI)—measurement or Shear Thinning Index (SHI)—measurement. In the present case primarily the Polydispersity Index (PI) is used as measurement. All the measurements are known in art and further defined below in the example section.

Thus the propylene copolymer (A) has preferably a Polydispersity Index (PI) of equal or below 4.0 $Pa^{-1}$, preferably of equal or below 3.5 $Pa^{-1}$ more preferably of equal or below 3.0 $Pa^{-1}$, still more preferably of equal or below 2.8 $Pa^{-1}$, like equal or below 2.5 $Pa^{-1}$. Lower values of the Polydispersity Index (PI) may be 1.0 $Pa^{-1}$, like 1.5 $Pa^{-1}$. Thus the Polydispersity Index (PI) of the propylene copolymer (A) is preferably in the range of 0.5 to 4.0 $Pa^{-1}$, more preferably in the range of 1.0 to 3.0 $Pa^{-1}$, yet more preferably in the range of 1.0 to 2.9, like 1.3 to 2.6 $Pa^{-1}$.

Moreover the propylene copolymer (A) can be unimodal or multimodal, like bimodal in view of the molecular weight distribution and/or the comonomer content distribution.

When the matrix is unimodal with respect to the molecular weight distribution and/or comonomer content, it may be prepared in a single stage process e.g. as slurry or gas phase process in a slurry or gas phase reactor. Preferably, the unimodal propylene copolymer (A) is polymerized as a slurry polymerization. Alternatively, the unimodal propylene copolymer (A) may be produced in a multistage process using at each stage process conditions which result in similar polymer properties.

The expression "multimodal" or "bimodal" used herein refers to the modality of the polymer, i.e.
the form of its molecular weight distribution curve, which is the graph of the molecular weight fraction as a function of its molecular weight,
or more preferably
the form of its comonomer content distribution curve, which is the graph of the comonomer content as a function of the molecular weight of the polymer fractions.

As will be explained below, the polymer components of the propylene copolymer (A) can be produced in a sequential step process, using reactors in serial configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

Accordingly the propylene copolymer (A) may be multimodal, like bimodal, in view of the comonomer content and/or molecular weight.

In any case the Polydispersity Index (PI) and/or the comonomer content of the propylene copolymer (A) as defined in the instant invention refer(s) to the total propylene copolymer (A) be it monomodal or multimodal, like bimodal.

Further it is preferred that the propylene copolymer (A) has a rather low melt flow rate. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.).

Thus it is required that propylene copolymer (A) has a melt flow rate ($MFR_2$ (230° C.)) equal or below 0.8 g/10 min, more preferred of equal or less than 0.5 g/10 min, still more preferred equal or less than 0.4 g/10 min. On the other hand the $MFR_2$ (230° C.) should be more than 0.05 g/10 min, more preferably more than 0.1 g/10 min.

In case the melt flow rate is measured under a load of 5 kg the following is preferred.

The propylene copolymer (A) has preferably a melt flow rate ($MFR_5$ (230 C)) equal or below 4.0 g/10 min, more preferred of equal or less than 2.5 g/10 min, still more preferred equal or less than 1.8 g/10 min. On the other hand the $MFR_2$ (230° C.) should be more than 0.1 g/10 min, more preferably more than 0.3 g/10 min. Accordingly a preferred range is from 0.3 to 1.8 g/10 min.

Additionally it is appreciated that the propylene copolymer (A) enables to provide pipes with a rather high resistance to deformation, i.e. have a high stiffness. Accordingly it is preferred that the propylene copolymer (A) in an injection moulded state and/or the pipes based on said material has(have) a flexural modulus measured according to ISO 178 of at least 1000 MPa, more preferably of at least 1150 MPa.

Furthermore it is appreciated that the propylene copolymer (A) enables to provide pipes having a rather high impact strength. Accordingly it is preferred that propylene copolymer (A) in an injection moulded state and/or the pipes based on said material has(have) an impact strength measured according the Charpy impact test (ISO 179 (1 eA)) at 23° C. of at least 50.0 kJ/m², more preferably of at least 53.0 kJ/m², yet more preferably of at least 55.0 kJ/m² and/or an high impact strength measured according the Charpy impact test (ISO 179 (1 eA)) at −20° C. of at least 1.5 kJ/m², more preferably of at least 2.0 kJ/m², yet more preferably of at least 2.5 kJ/m².

The instant propylene copolymer (A) has been in particular developed to improve the properties of pipes, in particular in terms of very good slow crack propagation performance by keeping the other properties, like resistance to deformation and impact strength, on a high level. Thus the instant invention is also directed to the use of the propylene copolymer (A) for a pipe, like a pressure pipe, or for parts of a pipe, like a pressure pipe, and for the manufacture of pipes.

In addition it is appreciated that the propylene copolymer (A) enables to provide pipes having a very good slow crack propagation performance. Thus it is preferred that the propylene copolymer (A) and/or the pipes based on said material has(have) a slow crack propagation performance measured according to the full notch creep test (FNCT) (ISO 16770; at 80° C. and applied stress of 4.0 MPa) of at least 1200 h.

The propylene copolymer (A) may comprise—in addition to the β-nucleating agents—further additives, like fillers not interacting with the β-nucleating agents, e.g. mica and/or chalk Furthermore, the present invention is also directed to pipes and/or pipe fittings, in particular pressure pipes, comprising the propylene copolymer (A) as defined in the instant invention. These pipes, in particular pressure pipes, are in particular characterized by the flexural modulus, impact strength and slow crack propagation performance as defined in the previous paragraphs.

The term "pipe" as used herein is meant to encompass hollow articles having a length greater than diameter. Moreover the term "pipe" shall also encompass supplementary parts like fittings, valves and all parts which are commonly necessary for e.g. a hot water piping system.

Pipes according to the invention also encompass single and multilayer pipes, where for example one or more of the layers is a metal layer and which may include an adhesive layer.

The propylene copolymer (A) used for pipes according to the invention may contain usual auxiliary materials, e.g. up to 10 wt.-% fillers and/or 0.01 to 2.5 wt.-% stabilizers and/or 0.01 to 1 wt.-% processing aids and/or 0.1 to 1 wt.-% antistatic agents and/or 0.2 to 3 wt.-% pigments and/or reinforcing agents, e.g. glass fibres, in each case based on the propylene copolymer (A) used (the wt.-% given in this paragraph refer to the total amount of the pipe and/or a pipe layer comprising said propylene copolymer (A)). In this respect, it has to be noted, however, that any of such of auxiliary materials which serve as highly active α-nucleating agents, such as certain pigments, are not utilized in accordance with the present invention.

The propylene copolymer (A) as defined above is preferably produced in the presence of the catalyst system as defined below. Furthermore, for the production of propylene copolymer (A) as defined above, the process as stated below is preferably used.

Thus the manufacture of the inventive propylene copolymer (A) comprises the steps of:
(a) producing a propylene copolymer (A) as defined herein, preferably in a multistage process and subsequently
(b) treating the propylene copolymer (A) with a β-nucleating agent (B), preferably at temperatures in the range of 175 to 300° C., and
(c) cooling and crystallizing the propylene copolymer (A) composition.

In the following the process and the catalyst system employed therein will be described in more detail.

The catalyst system used to obtain the propylene copolymer (A) according to this invention is defined as follows.

A solid catalyst system comprising a
(a) an organo-zirconium compound of formula (I)

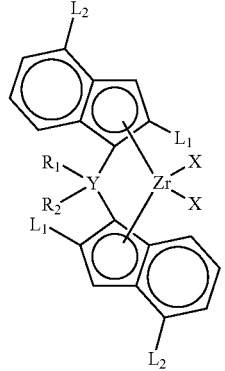

(I)

wherein
each "$L_1$" can be the same or different and is an alkyl residue,
each "$L_2$" can be the same or different and is a substituted aromatic residue selected from the group consisting of

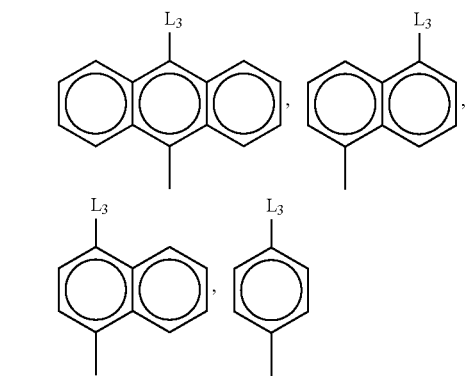

"$L_3$" is an alkyl residue,
"Y" is a bridging group linking the indenyl ligands,
"$R_1$" and "$R_2$" are organic residues,
"X" is a ligand with a σ-bond to the zirconium (Zr),
(b) a cocatalyst (Co) comprising an element (E) of group 13 of the periodic table (IUPAC),
wherein the catalyst system has a porosity of less than 1.40 ml/g measured according to DIN 66135 and/or a surface area of lower than 25 m²/g measured according to ISO 9277.

Preferably this catalyst system for the preparation of the propylene copolymer (A) is itself polymerized thus obtaining a polymerized solid catalyst composition as defined in more detail below.

It has been surprisingly found out that with this specific solid catalyst system successfully, i.e. with high productivity, the propylene copolymer (A) according to this invention is obtainable (see examples).

Preferably the residues $L_1$ and $L_2$ of the indenyl rings of the organo-zirconium compound are identical.

Further, the residue "$L_1$" is preferably a C1 to C10 alkyl residue, more preferably a $C_1$-$C_6$ alkyl residue, e.g. methyl, ethyl, isopropyl, still more preferably methyl or ethyl, i.e. methyl.

The residues "$L_2$" are substituted aromatic ring systems, preferably the residues "$L_2$" are selected from the group consisting of substituted phenyl, substituted naphthyl and substituted anthracenyl. More specifically the residues "$L_2$" are selected from the group consisting of

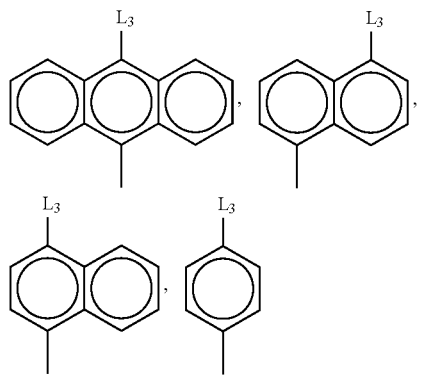

wherein "$L_3$" is an alkyl residue.

More preferably the residue "$L_3$" is a C1 to C10 alkyl residue, still more preferably the residue "$L_3$" is a C1 to C6 alkyl residue, like methyl, ethyl iso-propyl, tert-butyl, 2-methyl-butyl, yet more preferably the "$L_3$" is selected from the group consisting of iso-propyl, tert-butyl, 2-methyl-butyl, e.g. tert-butyl.

Accordingly in a preferred embodiment the residues "$L_2$" are a phenyl residues selected from the group consisting of

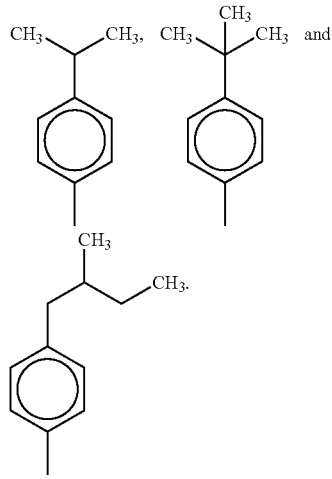

Most preferably the residues "$L_2$" are 4-tert-butyl-phenyl.

A further essential requirement is that the indenyl residues of the organo-zirconium compound are linked via a bridge.

More specifically the two five member rings of the indenyl rings are linked together via a bridge. Preferably the residue "Y" is C, Si or Ge, more preferably Si. The residues "$R_1$" and "$R_2$" of "Y" can be identical or different. However it is especially appreciated that the residues "$R_1$" and "$R_2$" are different.

The residues "$R_1$" and "$R_2$" can independently selected from the group consisting of $C_1$ to $C_{20}$ alkyl, $C_1$ to $C_{20}$ cycloalkyl, $C_6$ to $C_{12}$ aryl, $C_7$ to $C_{12}$ arylalkyl, or trimethylsilyl. More preferably the residues "$R_1$" and "$R_2$" are different and selected from the group consisting of $C_1$ to $C_{20}$ alkyl, $C_1$ to $C_{20}$ cycloalkyl, $C_6$ to $C_{12}$ aryl, $C_7$ to $C_{12}$ arylalkyl, or trimethylsilyl.

In a preferred embodiment the residues "$R_1$" and "$R_2$" are independently selected from the group consisting of $C_1$ to $C_{20}$ alkyl and $C_1$ to $C_{20}$ cycloalkyl. Even more preferred the residues "$R_1$" and "$R_2$" are different and selected from the group consisting of $C_1$ to $C_{20}$ alkyl and $C_1$ to $C_{20}$ cycloalkyl. In a preferred embodiment "$R_1$" is $C_1$ to $C_{20}$ alkyl, like methyl, ethyl or propyl, and "$R_2$" is $C_1$ to $C_{20}$ cycloalkyl, like cyclohexyl or cycloheptyl.

The ligands "X" can independently be selected from the group consisting of hydrogen, halogen, C1 to C20 alkyl, C1 to C20 alkoxy, C2 to C20 alkenyl, C2 to C20 alkynyl, C3 to C12 cycloalkyl, C6 to C20 aryl, C6 to C20 aryloxy, C7 to C20 arylalkyl, C7 to C20 arylalkenyl, —SR", —PR"$_3$, —SiR"$_3$, —OSiR"$_3$ and —NR"$_2$, wherein each R" is independently hydrogen, C1 to C20 alkyl, C2 to C20 alkenyl, C2 to C20 alkynyl, C3 to C12 cycloalkyl or C6 to C20 aryl. In a preferred embodiments the ligands "X" are identical and either halogen, like Cl, or benzyl.

Considering the statements above, especially suitable for the preparation of a propylene copolymer (A) according to this invention is an organo-zirconium compound having the formula (II)

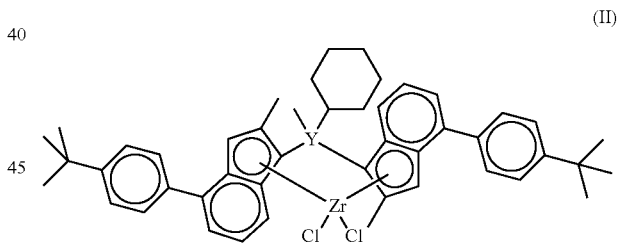

(II)

wherein "Y" is C, Ge, or Si, preferably Si.

As a further requirement the solid catalyst system for the preparation of the propylene copolymer (A) according to this invention must comprise a cocatalyst (Co) comprising an element (E) of group 13 of the periodic table (IUPAC), for instance the cocatalyst (Co) comprises a compound of Al.

Examples of such cocatalyst (Co) are organo aluminium compounds, such as trialkylaluminium compound and/or aluminoxane compound.

Aluminoxane cocatalysts are inter alia described in WO 94/28034 which is incorporated herein by reference. These are linear or cyclic oligomers of having up to 40, preferably 3 to 20, —(Al(R''')O)— repeating units (wherein R''' is hydrogen, C1 to C10-alkyl (preferably methyl) or C6 to C18-aryl or mixtures thereof).

Such compounds of Al, preferably aluminoxanes, can be used as the only compound in the cocatalyst (Co) or together with other cocatalyst compound(s). Thus besides or in addition to the compounds of Al, i.e. the aluminoxanes, other cation complex forming cocatalyst compounds, like boron compounds can be used. Said cocatalysts are commercially available or can be prepared according to the prior art literature. Preferably however in the manufacture of the solid catalyst system only compounds of Al as cocatalyst (Co) are employed.

In particular preferred cocatalysts (Co) are the aluminoxanes, in particular the C1 to C10-alkylaluminoxanes, most particularly methylaluminoxane (MAO).

Especially good results are achievable in case the mol ratio of element (E) of the cocatalyst (Co) and zirconium, preferably the mol ratio of Al of the cocatalyst (Co) and zirconium, are kept in a specific ratio. Accordingly it is appreciated that mol ratio of element (E) of the cocatalyst (Co) and zirconium [E/Zr], preferably the mol ratio of Al of the cocatalyst (Co) (like aluminoxanes, such as methylaluminumoxane (MAO)) and zirconium [Al/Zr], is in a range of 100 to 800 mol/mol, more preferably in a range of 150 to 600 mol/mol, yet more preferably in a range of 200 to 400 mol/mol, like 200 to 350 mol/mol.

Preferably, the organo-zirconium compound of formula (I) and the cocatalyst (Co) of the solid catalyst system represent at least 70 wt %, more preferably at least 80 wt %, even more preferably at least 90 wt %, even further preferably at least 95 wt % of the solid catalyst system. Thus it is appreciated that the solid catalyst system is featured by the fact that it is self-supported, i.e. it does not comprise any catalytically inert support material, like for instance silica, alumina or $MgCl_2$ or porous polymeric material, which is otherwise commonly used in heterogeneous catalyst systems, i.e. the catalyst is not supported on external support or carrier material. As a consequence that the solid metallocene catalyst system is self-supported it has a rather low surface area.

A low surface area is insofar appreciated as therewith the bulk density of the produced propylene copolymer (A) can be increased enabling a high throughput of material. Typically the solid catalyst system has a surface area measured according to the commonly known BET method with $N_2$ gas as analysis adsorptive of less than 25 $m^2/g$, more preferably of less than 20 $m^2/g$, yet more preferably of less than 15 $m^2/g$, still yet more preferably of less than 10 $m^2/g$. In some embodiments, the solid catalyst system used for the preparation of the propylene copolymer (A) shows a surface area of 5 $m^2/g$ or less, i.e. a surface area is below the detection limit.

The solid catalyst system can be additionally or alternatively defined by the pore volume, i.e. porosity. Thus it is appreciated that the catalyst particle has a porosity of less than 1.40 ml/g, more preferably of less than 1.00 ml/g, still more preferably of less than 0.50 ml/g and even less than 0.20 ml/g. In another preferred embodiment the porosity is not detectable when determined with the method applied as defined in the example section.

Moreover the solid catalyst system typically has a mean particle size of not more than 500 µm, i.e. preferably in the range of 2 to 500 µm, more preferably 5 to 200 µm. It is in particular preferred that the mean particle size is below 80 µm, still more preferably below 70 µm. A preferred range for the mean particle size is 5 to 70 µm, more preferred 10 to 60 µm.

The solid metallocene catalyst system is preferably obtained by the emulsion solidification technology as described in WO 03/051934. This document is herewith included in its entirety by reference.

Hence the solid catalyst system is preferably obtainable by a process by converting a solution (A) comprising the organo-zirconium compound and the cocatalyst (Co) to solid particles comprising the steps of
(a) generating a liquid/liquid emulsion by dispersing the solution (A) in a solvent (S) immiscible with said solution (A), wherein
  (i) the solvent (S) constitutes the continuous phase of the emulsion and
  (ii) the solution (A) constitutes in form of droplets the dispersed phase of the emulsion,
  (iii) the organo-zirconium compound and the cocatalyst (Co) are present in the droplets, and
(b) solidifying said dispersed phase to convert said droplets to solid particles.

More precisely the solid catalyst system is preferably obtainable by a process comprising the steps of
(a) preparing a solution (A) of the components of the solid catalyst system, wherein the solution (A) comprises at least a solvent (A'), the organo-zirconium compound and the cocatalyst (Co) as defined in the instant invention,
(b) dispersing said solution (A) in a solvent (B) immiscible therewith and optionally in the presence of a surfactant (S) to form an emulsion in which said components are present in the droplets of the dispersed phase, and
(c) solidifying said dispersed phase to convert said droplets to solid particles and recovering said particles to obtain said solid catalyst system.

Preferably an organic solvent (A') is used to form said solution (A). Still more preferably the organic solvent (A') is selected from the group consisting of a linear alkane, cyclic alkane, linear alkene, cyclic alkene, aromatic hydrocarbon, like toluene, and halogen-containing hydrocarbon. Toluene is in particular preferred as a solvent (A') to form the solution (A) with the components of the solid catalyst system.

Moreover the immiscible solvent (B) forming the continuous phase is an inert solvent, more preferably the immiscible solvent (B) comprises a fluorinated organic solvent and/or a functionalized derivative thereof, still more preferably the immiscible solvent (B) comprises a semi-, highly- or perfluorinated hydrocarbon and/or a functionalized derivative thereof. It is in particular preferred, that said immiscible solvent (B) comprises a perfluorohydrocarbon or a functionalized derivative thereof, preferably C3 to C30 perfluoroalkanes, -alkenes or -cycloalkanes, more preferred C4 to C10 perfluoro-alkanes, -alkenes or -cycloalkanes, particularly preferred perfluorohexane, perfluoroheptane, perfluorooctane or perfluoro(methylcyclohexane) or a mixture thereof.

Perfluorinated hydrocarbon denotes a hydrocarbon compound, where all hydrogen atoms are replaced with fluorine atom. Highly fluorinated hydrocarbon denotes a hydrocarbon compound, where at least half of the hydrogen atoms are replaced by fluorine atom.

Furthermore it is preferred that the emulsion comprising said continuous phase and said dispersed phase is a bi- or multiphasic system as known in the art.

A surfactant can be used for forming the emulsion. After the formation of the emulsion system, said catalyst is formed in situ from catalyst components in said solution.

In principle, the surfactant may be any suitable agent which contributes to the formation and/or stabilization of the emulsion and which does not have any adverse effect on the catalytic activity of the catalyst. The surfactant is based on hydrocarbons optionally interrupted with (a) heteroatom(s), preferably halogenated hydrocarbons optionally having a functional group, preferably semi-, highly- or perfluorinated hydrocarbons as known in the art, e.g. (2,2,3,3,4,4,5,5,6,6,7,7,8,8,9,9,-heptadecafluoronoyl)oxirane.

Alternatively, the surfactant may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_1$ to $C_{30}$ alcohol, (such as $C_4$-$C_{20}$, or $C_5$-$C_{10}$ alcohol, like heptanol, octanol or nonanol). For instance in preferred embodiments 2,2,3,3,4,4,5,5,6,6,7,7,-dodecafluoroheptanol and 2,2,3,3,4,4,5,5,6,6,7,7,8,8,9,9,9-heptadecafluorononylnonanol are is used as a surfactant precursors.

Suitable processes for dispersing the solution (A) within the solvent (B) is the use of mechanical as well as of ultrasound for mixing, as known to the skilled person. The process parameters, such as time of mixing, intensity of mixing, type of mixing, power employed for mixing, such as mixer velocity or wavelength of ultrasound employed, viscosity of solvent phase, are used for adjusting the size of the solid catalyst system.

In principle any solidification method can be used for forming the solid catalyst system from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a rapid temperature change of more than 35° C., preferably more than 40° C. Depending on the type and size of the apparatus the temperature change can vary, e.g. within less than 10 seconds, preferably less than 6 seconds.

For further details, embodiments and examples of the continuous and dispersed phase system, emulsion formation method, and solidification methods reference is made e.g. to the above cited international patent application WO 03/051934.

It has been additionally discovered that further improvement in the preparation of the propylene copolymer (A) can be achieved in case the solid catalyst system is protected against the reaction medium used for instance in slurry reactors. A protection of the solid catalyst system reduces sheeting in the reactor vessel and thus increases the output rate and the properties of the produced propylene copolymer (A). An effective protection can be accomplished in case the solid catalyst system is polymerized. Thus it is in particular appreciated that in the preparation of the propylene copolymer (A) a solid catalyst composition is employed, said solid catalyst composition comprises a polymer matrix and distributed therein a catalyst system as defined in detail above, wherein the weight ratio of the polymer matrix and the catalyst system [weight polymer matrix/weight catalyst system] in the solid catalyst composition is below 25.0.

The solid catalyst composition is in particular featured by the fact the catalyst systems is dispersed in a polymeric matrix material, i.e. the catalyst system is distributed within the polymer matrix. The term "distributed" shall preferably indicate that the catalyst system is not concentrated at one place within the matrix but (evenly) dispersed within the matrix. This has the advantage that—contrary to commercially available supported catalyst systems—an overheating at the beginning of the polymerization process due to "hot spots" areas caused by concentration of catalytic species at one place is diminished which in turn supports a start of the polymerization in a controlled way under mild conditions. The even distribution of catalyst system in the polymer matrix is mainly achieved due to the preparation of the solid catalyst composition as described in detail below. One remarkable feature of the process defined in detail below is that the catalyst composition is obtained by heterogeneous catalysis.

As stated above the polymer matrix of solid catalyst composition shall protect the catalytic active species within the solid catalyst composition against any possible dissolution phenomena in a slurry reactor, i.e. in low molar mass hydrocarbons, like propane, i-butane, pentane, hexane or propylene. On the other hand the protection of the catalyst system should be not too massive otherwise the catalytic activity of the active species might be deteriorated. In the present invention the conflicting interests one the one hand of high catalytic activity of the catalyst system and on the other hand of the solid stability of the catalyst system in the polymerization medium of the slurry reactor is achieved by protecting the catalyst system by a matrix wherein the matrix is present in rather low amounts within the solid catalyst composition. It has been surprisingly found out that a rather low weight ratio of polymer matrix to solid catalyst system [weight polymer matrix/weight solid catalyst system], leads to a satisfactory protection against dissolution by keeping the catalyst activity on high levels. Accordingly it is appreciated that the weight ratio of the solid composition [weight polymer matrix/weight solid catalyst system] is below 25.0, more preferably below 15.0, yet more preferably below 10.0, still yet more preferably below 5.0. On the other hand to achieve a reasonable protection against dissolution the polymerization degree shall preferably exceed a value of 0.5, more preferably of 0.7, yet more preferably of 1.0. Preferred ranges of the polymerization degree shall be 0.7 to 10.0, more preferably 1.0 to 8.0, yet more preferably 1.0 to 6.0, still more preferably 1.0 to 5.0, still yet more preferably of 2.0 to 5.0.

The polymer matrix can be any type of polymer as long as it prevents the dissolution of the catalyst system in the polymerization medium of a slurry reactor, i.e. low molar mass hydrocarbons, like propane, i-butane, pentane, hexane or propylene, and is catalytically inert. Accordingly the polymer matrix is preferably based on olefin monomers, like α-olefin monomers, each having 2 to 20 carbon atoms. The olefin, like α-olefin, can be linear or branched, cyclic or acyclic, aromatic or aliphatic. Preferred examples are ethylene, propylene, 1-butene, 1-pentene, 2-methyl-1-butene, 3-methyl-1-butene, 1-hexene, 2-methyl-1-pentene, 3-methyl-1-pentene, 4-methyl-1-pentene, 2-ethyl-1-butene, 2,3-dimethyl-1-butene, 1-octene, styrene, and vinylcyclohexane.

It is in particular preferred that the polymer matrix corresponds to the propylene copolymer (A) according to the present invention.

Further it is appreciated that the weight average molecular weight ($M_w$) of the polymer matrix is rather low. Thus it is preferred that the polymer matrix has weight average molecular weight ($M_w$) of below or equal 300,000 g/mol, more preferably below 50,000 g/mol. In preferred embodiments the weight average molecular weight ($M_w$) of the polymer matrix is in the range of 3,000 to 30,000 g/mol, more preferably in the range of 5,000 to 20,000 g/mol.

Concerning the indenyl ligands and/or the bridging groups (Y) of the organo-zirconium compound as defined in detail above it is preferred that do not form a chemical entity with the polymer matrix. Thus it is in particular preferred that the indenyl ligands and/or the bridging groups (Y) do not comprise a polymerizable residue. A polymerizable residue according to this invention is any functional group which enables the covalent bonding of the organo-zirconium compound via the indenyl ligands and/or the bridging groups (Y) with the polymer matrix. Accordingly it is in particular preferred that the indenyl ligands and/or the bridging groups (Y) of the organo-zirconium compound as defined in the instant invention do not comprise polymerizable olefinic groups, like olefinically unsaturated substituents. Examples of such polymerizable olefinic groups are substituents having the formula (III)

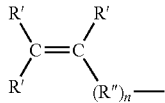

wherein
R" is a hydrocarbyl diradical having 1 to 20 carbon atoms; more preferably 2 to 10,
n is 1 or 0, and
each R' is individually selected from the group consisting of organo radicals having 1 to 10 carbon atoms and hydrogen.

Most preferably R" has at least two carbons in its main alkylene chain, i.e. it is a divalent ethylene radical or a higher homolog thereof.

Accordingly it is in particular preferred that of the indenyl ligands and/or the bridging groups (Y) do not comprise polymerizable olefinic groups having the formula (III).

As a consequence of the previous paragraph it is preferred that the polymer matrix is not covalent bonded to the organo-zirconium compound via the indenyl ligands and/or the bridging groups (Y).

The solid catalyst composition as preferably used in the instant invention is preferably as follows obtained.

The solid catalyst composition is produced by polymerizing olefin monomers, like α-olefins, in the presence of the above defined solid catalyst system, i.e. preferably in the presence of a self-supported solid catalyst system comprising an organo-zirconium compound of formula (I) and a cocatalyst (Co). Thus the polymerization is a heterogeneous polymerization. As a consequence of the polymerization process the catalyst system will be dispersed in the growing polymer matrix. To avoid an overheating during the polymerization and a dissolving of the catalyst system the polymerization is run preferably in a diluent.

Accordingly the process for the preparation of the solid catalyst composition comprises the steps of
(a) forming in a vessel a catalyst diluent slurry comprising the catalyst system as defined in detail above and a diluent,
(b) feeding at least one olefin monomer, preferably at least one α-olefin monomer, into the vessel,
(c) operating the vessel under such conditions that the at least one olefin monomer is polymerized by the catalyst system, producing thereby a solid catalyst composition comprising a polymer matrix in which the catalyst system is dispersed,
(d) terminating the polymerization of step (c) before the weight ratio of the polymer matrix and the catalyst system [weight polymer matrix (A)/weight catalyst system] in the solid catalyst composition is 25.0 or more.

Preferred is that the termination of the polymerization of step (c) is accomplished so that the weight ratio of the polymer matrix and the catalyst system [weight polymer matrix/weight catalyst system] in the solid catalyst composition is from 0.5 to 10.0, more preferably from 1.0 to 8.0, yet more preferably from 1.0 to 6.0, still more preferably from 1.0 to 5.0 and still yet more preferably of from 2.0 to 5.0.

The vessel used in the manufacture of the present invention is preferably stirred well in order to facilitate the dissolution of the gaseous monomer and keeping the monomer concentration constant in the oil.

The diluent to be used must be inert towards the catalyst. This means that it must preferably not contain components having tendency to react with the catalyst system, such as groups containing atoms selected from oxygen, sulphur, nitrogen, chlorine, fluorine, bromine, iodine and so on. Also groups containing double bonds or triple bonds should be avoided. Especially the presence of compounds like water, alcohols, organic sulphides, ketones, carbon monoxide, carbon dioxide and acetylenic compounds should be avoided.

Examples of useful diluents are oils, like hydrocarbon oil or silicon oil, more preferably hydrocarbon oil, or fluorinated hydrocarbons.

It is in particular preferred that said diluents contain less than 100 parts per million (ppm) of compounds containing groups as mentioned in the previous paragraph. More preferably the content of such compounds is less than 50 ppm, still more preferably less than 10 ppm, yet more preferably below the detection limit.

The viscosity of the oil during the catalyst polymerisation into the matrix can be within reasonable broad ranges. As preferably the reaction mixture is stirred during this step, settling is of no problem, even if low viscosity oils are used. After the desired catalyst composition of polymer matrix and catalyst system is obtained, the catalyst composition-oil slurry should be readily transportable into the polymerisation reactor. If desired, the viscosity of the slurry can be adjusted, i.e. increased afterwards by adding some more viscous material, e.g. grease, like vaseline into the system. The optimal viscosity of the catalyst composition-oil-slurry depends on the catalyst feeding systems in the process. If the viscosity will be kept too low, it might cause some settling problems during any storage time. However, if stirring systems are in use, this is not a problem. Very high viscosities of the slurry require special dosing systems.

Thus it is appreciated that the dynamic viscosity of the oil is from 5 to 3000 mPa·s at the operating temperature of the vessel, more preferably at temperature range from room-temperature (20° C.) to 70° C. Preferably the dynamic viscosity is from 10 to 1500 mPa·s, more preferably from 20 to 990 mPa·s, when measured at the operating temperature of the vessel, more preferably at temperature range from room-temperature to 70° C.

Moreover it is appreciated that the oil, preferably in case white oil is used, has density measured according to DIN EN ISO 12185 from 750 to 900 kg/m³.

Additionally it is preferred that the solubility of the catalyst system within the oil is rather low. Thus the oil shall be preferably selected in such a manner that the catalyst system has a solubility in the oil [amount of catalyst system solved in 100 g oil] below 0.1 g. I.e. catalyst system is dissolved not more than 0.1 wt-%, preferable less than 0.08 wt-%.

Examples of suitable oils are mineral oils and synthetic oils comprising essentially hydrocarbons containing from about 15 to about 100 carbon atoms, like Synton PAO 100, which is a synthetic oil supplied by Crompton Petroleum Additives, Shell Cassida HF 15, Shell Cassida HF 32, Shell Cassida 46, Shell Cassida HF 68 and Shell Cassida HF 100, which are synthetic oils supplied by Shell, Drakeol 35, which is a synthetic oil supplied by Penreco, Ondina 68, which is a mineral oil supplied by Shell and Primol 352, which is supplied by ExxonMobil. From the commercial products in particular Primol products, like Primol 352, are preferred.

If fluorinated hydrocarbon component(s) are used as diluent they can be used individually or as mixtures, and can be included in a mixture with non-fluorinated hydrocarbon compounds if desired, however, preferably fluorinated hydrocarbons are used alone.

The fluorinated hydrocarbon compounds have at least one carbon atom and at least one fluorine atom. The fluorinated hydrocarbon compounds can be perfluorinated hydrocarbon compounds or the fluorinated hydrocarbon compounds can optionally include one or more hydrogen atom(s). A perfluorinated hydrocarbon compound is a fluorocarbon compound in which the hydrogen directly attached to the carbon atom(s) is completely replaced by fluorine. See Hawley's Condensed Chemical Dictionary, Thirteenth Edition, Van Nostrand Renhold, 1997. Examples of preferred perfluorocarbons include linear branched or cyclic, C1 to C40 perfluoroalkanes.

In one embodiment, the fluorinated hydrocarbon compounds are represented by the formula (V)

$$C_xH_yF_z \qquad (V)$$

wherein x is an integer from 1 to 40, preferably from 4 to 30, more preferably from 4 to 20, yet more preferably from 1 to 10, like from 4 to 6, wherein
y is greater than or equal to 0, and
z is an integer and at least one,
more preferably y and z are integers and at least one.
In a preferred embodiment z is 4 or more.

Non-limiting examples of fluorinated hydrocarbon compounds include 1-fluorobutane, 2-fluorobutane, 1,1-difluorobutane, 1,2-difluorobutane, 1,3-difluorobutane, 1,4-difluorobutane, 2,2-difluorobutane, 2,3-difluorobutane, 1,1,1-trifluorobutane, 1,1,2-trifluorobutane, 1,1,3-trifluorobutane, 1,1,4-trifluorobutane, 1,2,2-trifluorobutane, 1,2,3-trifluorobutane, 1,3,3-trifluorobutane, 2,2,3-trifluorobutane, 1,1,1,2-tetrafluorobutane, 1,1,1,3-tetrafluorobutane, 1,1,1,4-tetrafluorobutane, 1,1,2,2-tetrafluorobutane, 1,1,2,3-tetrafluorobutane, 1,1,2,4-tetrafluorobutane, 1,1,3,3-tetrafluorobutane, 1,1,3,4-tetrafluorobutane, 1,1,4,4-tetrafluorobutane, 1,2,2,3-tetrafluorobutane, 1,2,2,4-tetrafluorobutane, 1,2,3,3-tetrafluorobutane, 1,2,3,4-tetrafluorobutane, 2,2,3,3-tetrafluorobutane, 1,1,1,2,2-pentafluorobutane, 1,1,1,2,3-pentafluorobutane, 1,1,1,2,4-pentafluorobutane, 1,1,1,3,3-pentafluorobutane, 1,1,1,3,4-pentafluorobutane, 1,1,1,4,4-pentafluorobutane, 1,1,2,2,3-pentafluorobutane, 1,1,2,2,4-pentafluorobutane, 1,1,2,3,3-pentafluorobutane, 1,1,2,4,4-pentafluorobutane, 1,1,3,3,4-pentafluorobutane, 1,2,2,3,3-pentafluorobutane, 1,2,2,3,4-pentafluorobutane, 1,1,1,2,2,3-hexafluorobutane, 1,1,1,2,2,4-hexafluorobutane, 1,1,1,2,3,3-hexafluorobutane, 1,1,1,2,3,4-hexafluorobutane, 1,1,1,2,4,4-hexafluorobutane, 1,1,1,3,3,4-hexafluorobutane, 1,1,1,3,4,4-hexafluorobutane, 1,1,1,4,4,4-hexafluorobutane, 1,2,2,3,3-hexafluorobutane, 1,1,2,2,3-hexafluorobutane, 1,1,2,2,4-hexafluorobutane, 1,1,2,3,3-hexafluorobutane, 1,1,2,3,4,4-hexafluorobutane, 1,2,2,3,3-hexafluorobutane, 1,1,1,2,2,3,3-heptafluorobutane, 1,1,1,2,2,4,4-heptafluorobutane, 1,1,1,2,2,3,4-heptafluorobutane, 1,1,1,2,3,3,4-heptafluorobutane, 1,1,1,2,3,4,4-heptafluorobutane, 1,1,1,2,4,4,4-heptafluorobutane, 1,1,1,3,3,4,4-heptafluorobutane, 1,1,1,2,2,3,3,4-octafluorobutane, 1,1,1,2,2,3,4,4-octafluorobutane, 1,1,1,2,3,3,4,4-octafluorobutane, 1,1,1,2,2,4,4,4-octafluorobutane, 1,1,1,2,3,4,4,4-octafluorobutane, 1,1,1,2,2,3,3,4,4-nonafluorobutane, 1,1,1,2,2,3,4,4,4-nonafluorobutane, 1-fluoro-2-methylpropane, 1,1-difluoro-2-methyl[rho]ropane, 1,3-difluoro-2-methylpropane, 1,1,1-trifluoro-2-methylpropane, 1,1,3-trifluoro-2-methylpropane, 1,3-difluoro-2-(fluoromethyl)propane, 1,1,1,3-tetrafluoro-2-methylpropane, 1,1,3,3-tetrafluoro-2-methylpropane, 1,1,3-trifluoro-2-(fluoromethyl)propane, 1,1,1,3,3-pentafluoro-2-methylpropane, 1,1,3,3-tetrafluoro-2-(fluoromethyl)propane, 1,1,1,3-tetrafluoro-2-(fluoromethyl)propane, fluorocyclobutane, 1,1-difluorocyclobutane, 1,2-difluorocyclobutane, 1,3-difluorocyclobutane, 1,1,2-trifluorocyclobutane, 1,1,3-trifluorocyclobutane, 1,2,3-trifluorocyclobutane, 1,1,2,2-tetrafluorocyclobutane, 1,1,3,3-tetrafluorocyclobutane, 1,1,2,2,3-pentafluorocyclobutane, 1,1,2,3,3-pentafluorocyclobutane, 1,1,2,2,3,3-hexafluorocyclobutane, 1,1,2,2,3,4-hexafluorocyclobutane, 1,1,2,3,3,4-hexafluorocyclobutane, 1,1,2,2,3,3,4-heptafluorocyclobutane, perfluorodecalin, perfluoroheptane, perfluorohexane, perfluoromethylcyclohexane, perfluorooctane, perfluoro-1,3-dimethylcyclohexane, perfluorononane and perfluorotoluene. In addition to those fluorinated hydrocarbons described herein, those fluorinated hydrocarbons described in Raymond Will, et. al., CEH Marketing Report, Fluorocarbons, Pages 1-133, by the Chemical Economics Handbook-SRI International, April 2001, which is fully incorporated herein by reference, are included.

In a particular preferred embodiments the fluorinated hydrocarbon compound is selected from the group consisting of perfluorinated C1 to C15 alkane, perfluorodecalin, perfluoroheptane, perfluorohexane, perfluoromethylcyclohexane, perfluorooctane, perfluoro-1,3-dimethylcyclohexane, perfluorononane and perfluorotoluene. The most preferred fluorinated hydrocarbon compound is perfluoro-1,3-dimethylcyclohexane.

Most preferably the fluorinated hydrocarbon compound is perfluoro-1,3-dimethylcyclohexane.

The diluent slurry may be formed in any method known in the art. According to a preferred method, the solid catalyst system is introduced into the diluent under agitation. The slurry may be prepared in the vessel or it may be prepared in advance and then transferred into the vessel. Further, the solid catalyst system may also be delivered into the vessel as concentrated slurry, which may then be diluted with the diluent in the vessel.

The diluent slurry may be homogenised by agitation. The agitation can be obtained by circulating the diluent slurry by using a circulation pump and pipes connecting the pump to the vessel. Alternatively, the vessel is equipped with an agitator, which keeps the diluent slurry within the vessel in motion, and facilitates the dissolution of gaseous monomer into the diluent. Preferably the vessel is equipped with an agitator. The elements of the agitator should be chosen so that uniform stirring in the whole volume of the vessel is obtained and no dead spots where the catalyst system could settle exist. These stirrer elements, such as anchor type elements and axial and radial impellers are well known in the art and a person skilled in the art can choose a suitable combination for each geometry of the vessel. The vessel may also be equipped with baffles, which are known in the art to further improve the stirring.

As monomers preferably olefins, like α-olefins, are employed. More preferably the olefins, like α-olefins, have 2 to 20 carbon atoms. The olefins, like α-olefins, can be linear or branched, cyclic or acyclic, aromatic or aliphatic. Preferred examples are ethylene, propylene, 1-butene, 1-pentene, 2-methyl-1-butene, 3-methyl-1-butene, 1-hexene, 2-methyl-1-pentene, 3-methyl-1-pentene, 4-methyl-1-pentene, 2-ethyl-1-butene, 2,3-dimethyl-1-butene, 1-octene, styrene, and vinylcyclohexane. Most preferably the monomer is propylene.

The temperature of the slurry within the vessel during polymerization in step (c) depends on the catalyst system used as well as on the monomers chosen. Thus it is appreciated that the reaction temperature is equal or below 70° C., more preferably below 65° C. Of course also to low temperatures might cause problems because the viscosity might be too high then. Thus the temperature may be selected from the range of from −30 to 70° C., more preferably from 0 to 65° C., yet more preferably from 20 to 55° C.

The pressure within the vessel at step (c) of the polymerization process shall be kept in a certain range. It is desired that the pressure in the vessel is higher than the atmospheric pressure to minimise the eventual leaks of air and/or moisture into the catalyst feed vessel. Thus it is appreciated that the pressure is in the range of at least 0.2 to 15 bar, more preferably in the range of 1 to 10 bar, even more preferred in the range of 2.5 to 8 bar.

The vessel shall be maintained in inert atmosphere. Especially, the presence of oxygen and moisture should be avoided.

The gas phase in the vessel should preferably consist of nitrogen, argon and similar inert gases, or their mixtures. Also, the vessel should be equipped with possibility to flush the vessel with inert gas, preferably with nitrogen. Of course in addition to the used monomers, in gaseous form, also hydrogen, used as molecular weight controlling agent is preferably fed into the vessel.

After the desired polymerization degree the polymerization is terminated (step (d)). The termination is preferably achieved by degassing the vessel.

After the termination of the polymerization the oil slurry preferably comprises at least 20 wt.-%, more preferably up to 25 wt.-% of the produced solid catalyst composition.

Preferably, the oil slurry is removed from the vessel after the termination of the polymerization process. The thus obtained solid catalyst composition can be, if desired, extracted from the oil. However, it is also possible to use the prepared catalyst composition-oil slurry as such in the polymerisation process as defined in more detail below, without any extraction or drying steps.

Accordingly the present invention is also directed to a process for the preparation of the propylene copolymer (A) according to this invention comprising the steps of
(a) optionally polymerizing a solid catalyst system to a solid catalyst composition, and
(b) polymerizing in the presence of said solid catalyst system or said solid catalyst composition propylene, 1-butene and optionally ethylene and/or C5 to C10 α-olefin(s) obtaining a propylene copolymer according to this invention as defined in detail above.

Preferably the polymerization step (b) is conducted in a reactor system comprising at least one slurry rector, preferably at least one loop reactor, and/or at least one gas phase rector. It is in particular appreciated that the preparation of the polypropylene is conducted in a multistage polymerization, i.e. the polypropylene is first polymerized in the slurry reactor and subsequently in at least one further slurry reactor and/or at least one gas phase reactor. Even more preferably the polypropylene is produced first in a slurry reactor, i.e. loop reactor, and subsequently in at least one gas phase reactor, preferably in one or two gas phase reactors.

A preferred multistage process is a "loop-gas phase"-process, such as developed by Borealis (known as BORSTAR® technology) described e.g. in patent literature, such as in EP 0887 379 or EP 517 868.

Optionally, the process can further comprise a prepolymerisation step in a manner known in the field, which prepolymerisation step may precede the first actual polymerization step and may be in particular suitable in case the solid catalyst system as such is intended to be used in the polymerization process.

If the polypropylene composition is multimodal at least with respect to the molecular weight distribution (MWD), then the lower molecular weight (LMW) component and the higher molecular weight (HMW) component are made in different steps (b1) and (b2), in any order. The LMW fraction is preferably component (i) produced in step (b1) and the HMW fraction is component (ii) which is produced in a subsequent step (b2) in the presence of component (i) as obtained from the first reactor (step (b1)).

The process of the invention is preferably a continuous process.

Temperature conditions in the reactor system for producing the propylene copolymer (A) is in the range of 40° C. to 130° C., more preferably in the range of 50 to 110° C.

Therefore the conditions for the slurry reactor, preferably loop reactor, of step (b1) may be as follows:
the temperature is within the range of 40° C. to 110° C., preferably between 60° C. and 100° C. or 70 to 95° C.,
the pressure is within the range of 20 bar to 80 bar, preferably between 30 bar to 60 bar,
hydrogen can be added for controlling the molar mass in a manner known per se
the residence time is typically 0.5 to 5 hours, e.g. 0.5 to 2 hours.

In gas phase reactor (step (b2)) the conditions are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se,
the residence time is typically 1 to 8 hours.

The gas phase polymerisation may be conducted in a manner known in the art, such as in a fluidised bed or in an agitated bed. Also fast fluidisation may be utilised.

The amount of propylene, 1-butene and optionally ethylene and/or C5 to C10 α-olefin(s) fed during the total process depends very much on the desired end product. The same applies for hydrogen feed, temperature and pressure used in the polymerization steps (b1) to (b2) as long as the above predefined ranges are considered. This exact amount and ratios needed for the polymerization of the respective polypropylene can be easily determined by a person skilled in the art.

Scavengers can be also used in the polymerization. As catalyst scavengers Al compounds, like Al alkyl compounds, e.g. triethyl aluminium, and tri-1-butyl aluminium are used.

Preferably in the polymerization of the polypropylene (steps (b1) and (b2)) an antifouling composition can be fed. The antifouling composition according to this invention comprises an organic compound which has at least 14 carbon atoms and comprises at least one polar functional group.

Preferably, the polar functional group is selected from the group consisting of hydroxyl including phenolic groups, carboxylic acid, ketone, aldehyde, ester, ether, thioether, amine, epoxy, thiol, or any combination thereof.

Preferably, the organic compound comprises a hydrocarbyl group having at least 5 carbon atoms. In a preferred embodiment, the hydrocarbyl group having at least 5 carbon atoms is selected from linear or branched $C_{10}$ to $C_{22}$ hydrocarbyl groups, which may optionally include one or more carbon-carbon double bonds.

In a preferred embodiment, the organic compound may comprise at least one substituted or unsubstituted cyclic moiety having at least 5 ring atoms. Preferably, said cyclic moiety is a tetrahydrofuranyl ring having at least one, preferably two hydroxyl groups attached to the ring.

Preferably, the organic compound is selected from sterically hindered phenols, ethoxylated amines, ethoxylated amides, sorbitan ester compounds, thioether compounds, or mixtures thereof.

Preferably, the sorbitan ester is a sorbitan $C_8$ to $C_{20}$ fatty acid ester. More preferably, the sorbitan fatty acid ester is selected from sorbitan stearate, sorbitan monooleate, or mixtures thereof.

After the polymerization the propylene copolymer (A) is blended with the β-nucleating agent (B) as defined above to obtain the propylene copolymer (A). The mixing can be carried out by methods known per se, e.g. by mixing the propylene copolymer (A) with the β-nucleating agent (B) in the desired weight relationship using a batch or a continuous process. As examples of typical batch mixers the Banbury and the heated roll mill can be mentioned. Continuous mixers are exemplified by the Farrel mixer, the Buss co-kneader, and single- or twin-screw extruders.

In case pipes shall be produced of the propylene copolymer (A) than after the manufacture of the inventive material the following steps follow. In general the inventive propylene copolymer (A) is extruded and subsequently formed into a pipe.

Accordingly the inventive pipe is preferably produced by first plasticizing the propylene copolymer (A) of the instant invention in an extruder at temperatures in the range of from 200 to 300° C. and then extruding it through an annular die and cooling it.

The extruders for producing the pipe can be single screw extruders with an L/D of 20 to 40 or twin screw extruders or extruder cascades of homogenizing extruders (single screw or twin screw). Optionally, a melt pump and/or a static mixer can be used additionally between the extruder and the ring die head. Ring shaped dies with diameters ranging from approximately 16 to 2000 mm and even greater are possible.

The melt arriving from the extruder is first distributed over an annular cross-section via conically arranged holes and then fed to the core/die combination via a coil distributor or screen. If necessary, restrictor rings or other structural elements for ensuring uniform melt flow may additionally be installed before the die outlet. After leaving the annular die, the pipe is taken off over a calibrating mandrel, usually accompanied by cooling of the pipe by air cooling and/or water cooling, optionally also with inner water cooling.

The present invention will now be described in further detail by the examples provided below.

EXAMPLES

Definitions/Measuring Methods

The following definitions of terms and determination methods apply for the above general description of the invention as well as to the below examples unless otherwise defined.

Melting Temperature and Degree of Crystallinity

Melting temperature Tm, crystallization temperature Tcr, and the degree of crystallinity were measured with Mettler TA820 differential scanning calorimetry (DSC) on 5 to 10 mg, typically 8±0.5 mg samples. Both crystallization and melting curves were obtained during 10° C./min cooling and heating scans between 30° C. and 225° C. Melting and crystallization temperatures were taken as the peaks of endotherms and exotherms. The degree of crystallinity was calculated by comparison with heat of fusion of a perfectly crystalline polypropylene, i.e. 209 J/g.

Randomness

In the FTIR measurements, films of 250-mm thickness were compression moulded at 225° C. and investigated on a Perkin-Elmer System 2000 FTIR instrument. The ethylene peak area (760-700 $cm^{-1}$) was used as a measure of total ethylene content. The absorption band for the structure —P-E-P— (one ethylene unit between propylene units), occurs at 733 $cm^{-1}$. This band characterizes the random ethylene content. For longer ethylene sequences (more than two units), an absorption band occurs at 720 $cm^1$. Generally, a shoulder corresponding to longer ethylene runs is observed for the random copolymers. The calibration for total ethylene content based on the area and random ethylene (PEP) content based on peak height at 733 $cm^{-1}$ was made by $^{13}C\text{-NMR}$. (Thermochimica Acta, 66 (1990) 53-68).

Number Average Molecular Weight ($M_n$), Weight Average Molecular Weight ($M_w$) and Molecular Weight Distribution (MWD) are Determined by Gel Permeation Chromatography (GPC) According to the Following Method:

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterised broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Rheology: Dynamic rheological measurements were carried out with Rheometrics RDA-II QC on compression molded samples under nitrogen atmosphere at 200° C. using 25 mm—diameter plate and plate geometry. The oscillatory shear experiments were done within the linear viscoelastic range of strain at frequencies from 0.01 to 500 rad/s. (ISO6721-1)

The values of storage modulus (G'), loss modulus (G"), complex modulus (G*) and complex viscosity (η*) were obtained as a function of frequency (ω).

The Zero shear viscosity ($η_0$) was calculated using complex fluidity defined as the reciprocal of complex viscosity. Its real and imaginary part are thus defined by $$f'(ω)=η'(ω)/[η'(ω)^2+η''(ω)^2] \text{ and}$$

$$f''(ω)=η''(ω)/[η'(ω)^2+η''(ω)^2]$$

From the following equations $$η'=G''/ω \text{ and } η''=G'/ω$$

$$f'(ω)=G'(ω)*ω/[G'(ω)^2+G''(ω)^2]$$

$$f''(ω)=G''(ω)*ω/[G'(ω)^2+G''(ω)^2]$$

The polydispersity index, PI, is calculated from cross-over point of G'(ω) and G"(ω). There is a linear correlation between f' and f" with zero ordinate value of $1/η_0$ (Heino et al.[1]) For polypropylene this is valid at low frequencies and five first points (5 points/decade) are used in calculation of $η_0$.

Shear thinning indexes (SHI), which are correlating with MWD and are independent of MW, were calculated according to Heino[1,2] (below).

SHI

SHI is calculated by dividing the Zero Shear Viscosity by a complex viscosity value, obtained at a certain constant shear stress value, G*. The abbreviation, SHI (0/50), is the ratio between the zero shear viscosity and the viscosity at the shear stress of 50 000 Pa.

1) Rheological characterization of polyethylene fractions. Heino, E. L.; Lehtinen, A; Tanner, J.; Seppälä, J. Neste Oy, Porvoo, Finland. Theor. Appl. Rheol., Proc. Int. Congr. Rheol., 11th (1992), 1 360-362

2) The influence of molecular structure on some rheological properties of polyethylene. Heino, Eeva-Leena. Borealis Polymers Oy, Porvoo, Finland Annual Transactions of the Nordic Rheology Society, 1995

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chüjö, and T. Asakura, Polymer 29 138-43 (1988). and Chujo R, et al, Polymer 35 339 (1994).

The NMR-measurement was used for determining the mmmm pentad concentration in a manner well known in the art.

Melt Flow Rate (MFR$_2$)

The melt flow rates were measured with a load of 2.16 kg at 230° C. The melt flow rate is that quantity of polymer in grams which the test apparatus standardized to ISO 1133 extrudes within 10 minutes at a temperature of 230° C. under a load of 2.16 kg.

Comonomer Content

The comonomer contents of the copolymer was determined by quantitative Fourier transform infrared spectroscopy (FTIR) calibrated to results obtained from quantitative $^{13}$C NMR spectroscopy.

Thin films were pressed to a thickness of between 300 to 500 µm at 190° C. and spectra recorded in transmission mode. Relevant instrument settings include a spectral window of 5000 to 400 wave-numbers (cm$^{-1}$), a resolution of 2.0 cm$^{-1}$ and 8 scans.

The butene content of a propylene-butene copolymer was determined using the baseline corrected peak maxima of a quantitative band at 767 cm$^1$, with the baseline defined from 780-750 cm$^1$.

The 1-butene content of a propylene-butene copolymer was determined using the baseline corrected peak maxima of a quantitative band at 727 cm$^1$, with the baseline defined from 758.5 to 703.0 cm$^1$)

The comonomer content(C) was determined using a film thickness method using the intensity of the quantitative band I(q) and the thickness of the pressed film T using the following relationship: [I(q)/T]m+c=C where m and c are the coefficients determined from the calibration curve constructed using the comonomer contents obtained from 13C NMR spectroscopy.

Content of β-Modification:

The β-crystallinity is determined by Differential Scanning calorimetry (DSC). DSC is run according to ISO 3146/part 3/method C2 with a scan rate of 10° C./min. The amount of β-modification is calculated from the second heat by the following formula:

β-area/(α-area+β-area)

Since the thermodynamical β-modification starts to be changed into the more stable α-modification at temperatures above 150° C., a part of the β-modification is transferred within the heating process of DSC-measurement. Therefore, the amount of β-PP determined by DSC is lower as when measured according to the method of Turner-Jones by WAXS (A. Turner-Jones et. al., Makromol. Chem. 75 (1964) 134).

"Second heat" means that the sample is heated according to ISO 3146/part 3/method C2 for a first time and then cooled to room temperature at a rate of 10° C./min. The sample is then heated a second time, also according to ISO 3146/part 3/method C2. This second heat is relevant for measurement and calculation.

During the "first heat" all thermal history of the sample giving rise to different crystalline structure, which typically comes from different processing conditions and/or methods, is destroyed. Using the second heat for determination of β-crystallinity, it is possible to compare samples regardless of the way the samples were originally manufactured.

The Xylene Solubles (XS, wt.-%):

Analysis according to the known method (ISO 6427): 2.0 g of polymer is dissolved in 250 ml p-xylene at 135° C. under agitation. After 30±2 minutes the solution is allowed to cool for 15 minutes at ambient temperature (21° C.) and then allowed to settle for 30 minutes at 25±0.5° C. The solution is filtered and evaporated in nitrogen flow and the residue dried under vacuum at 90° C. until constant weight is reached.

$$XS\% = (100 \times m_1 \times v_0)/(m_0 \times v_1),$$

wherein
$m_0$=initial polymer amount (g)
$m_1$=weight of residue (g)
$v_0$=initial volume (ml)
$V_1$=volume of analyzed sample (ml)

Intrinsic viscosity is measured according to DIN ISO 1628/1, October 1999 (in Decalin at 135° C.).

Charpy Impact Strength

Charpy impact strength was determined according to ISO 179:2000 on V-notched samples at 23° C. (Charpy impact strength (23° C.)) and −20° C. (Charpy impact strength (−20° C.)) by using injection moulded test specimens as described in EN ISO 1873-2 (80×10×4 mm)

Flexural Modulus

Flexural modulus: was measured according to ISO 178 (room temperature, if not otherwise mentioned) by using injection moulded test specimens as described in EN ISO 1873-2 (80×10×4 mm)

FNCT

Is determined according ISO 16770. The test specimens are compression moulded plates (thickness 10 mm). The test specimens are stressed in an aqueous solution at 80° C. and 4 N/mm$^2$. For each sample 3 specimens are tested and reported individually, indicated by FNCT/1, FNCT/2 and FNCT/3.

Density

Density of the oil was measured according to ISO 12185.

Dynamic Viscosity

Dynamic viscosity of the oil was obtained as the product of the kinematic viscosity and the density.

Kinematic Viscosity

Kinematic viscosity of the oil was measured according to ISO 3104.

Porosity: BET with N$_2$ gas, ASTM 4641, apparatus Micromeritics Tristar 3000; sample preparation (catalyst and polymer): at a temperature of 50° C., 6 hours in vacuum.

Surface area: BET with N$_2$ gas ASTM D 3663, apparatus Micromeritics Tristar 3000: sample preparation (catalyst and polymer): at a temperature of 50° C., 6 hours in vacuum.

Mean particle size is measured with Coulter Counter LS200 at room temperature with n-heptane as medium.

Median particle size ($d_{50}$) is measured with Coulter Counter LS200 at room temperature with n-heptane as medium Bulk density BD of the polymer powder was determined according to ASTM D1895-96, method A.

ICP Analysis

The elemental analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was then added to hydrofluoric acid (HF, 40%, 3% of V), diluted with DI water up to the final volume, V, and left to stabilise for two hours.

The analysis was run at room temperature using a Thermo Elemental IRIS Advantage XUV Inductively Coupled Plasma-Atomic Excitation Spectrometer (ICP-AES) which was calibrated immediately before analysis using a blank (a solution of 5% $HNO_3$, 3% HF in DI water), a low standard (10 ppm Al in a solution of 5% $HNO_3$, 3% HF in DI water), a high standard (50 ppm Al, 50 ppm Hf, 20 ppm Zr in a solution of 5% $HNO_3$, 3% HF in DI water) and a quality control sample (20 ppm Al, 20 ppm Hf, 10 ppm Zr in a solution of 5% $HNO_3$, 3% HF in DI water).

The content of hafnium was monitored using the 282.022 nm and 339.980 nm lines and the content for zirconium using 339.198 nm line. The content of aluminium was monitored via the 167.081 nm line, when Al concentration in ICP sample was between 0-10 ppm and via the 396.152 nm line for Al concentrations between 10-100 ppm.

The reported values, required to be between 0 and 100, or further dilution is required, are an average of three successive aliquots taken from the same sample and are related back to the original catalyst using equation 1.

$$C = \frac{R \times V}{M} \quad \text{Equation 1}$$

wherein

C is the concentration in ppm, related to % content by a factor of 10,000

R is the reported value from the ICP-AES

V is the total volume of dilution in ml

M is the original mass of sample in g

If dilution was required then this also needs to be taken into account by multiplication of C by the dilution factor.

Inventive Example 1 (E 1)

Preparation of the Solid Catalyst System

In a 50-mL glass reactor, equipped with an overhead stirrer, a liquid-liquid 2-phase system was generated at 0° C. from 40 mL of hexadecafluoro-1,3-dimethylcyclohexane (PFC) and a catalyst solution based on 89 mg of rac-cyclohexyl(methyl)silanediylbis[2-methyl-4-(4'-tert-butylphenyl)indenyl]zirconium dichloride contacted with 5 mL of a 30 wt-% methylaluminoxane (MAO) solution in toluene for 30 min. To that mixture, 0.4 mL of (2,2,3,3,4,4,5,5,6,6,7,7,8,8,9,9,9-heptadecafluorononyl)oxirane (PFPO) solution in PFC [prepared by mixing 0.5 mL (2,2,3,3,4,4,5,5,6,6,7,7,8,8,9,9,9-heptadecafluorononyl)oxirane+4.5 mL PFC] was added. The reaction mixture was stirred for 3 min, emulsion stability was verified, and stirring (570 rpm) was continued still for 15 min at 0° C., after which the emulsion was transferred via cannula under stirring to 100 mL of hot PFC (heated up with an oil bath at 90° C., and stirred at 400 rpm). Stirring was continued for 15 min, after which the oil bath was taken down and the mixing speed was reduced to 300 rpm and finally switched off. The catalyst was let to float by waiting for 45 min, after which PFC was siphoned away. The solid powder was dried for 2 hours at 50° C. under argon flow.

The mean particle size of the powder was measured by Coulter counter to be 13 µm.

Porosity and surface area were both below the measurement limit.

Al content 33.1 wt-%
Zr content 0.55 wt-%
Al/Zr mol/mol ratio 200 mol/mol 1-butene/propylene polymer polymerization (E 1):

A 20-L autoclave equipped with an anchor stirrer is evacuated and flushed repeatedly with nitrogen at elevated temperature (155° C.). The reactor is filled with 58 g 1-butene and 3562 g propylene, temperature is set to 30° C. and triethylaluminum (TEA) solution (1 molar) in n-hexane (5.8 ml) is fed to the reactor with 250 g propylene. Subsequently 24 mmol hydrogen is spilled with 500 g propylene into the reactor. The mixture is stirred for at least 15 min before the catalyst as obtained above (395 mg) is contacted with 5 ml hexadecafluoro-1,3-dimethyl-cyclohexane (1.5 bar $N_2$-pressure used for transfer to catalyst feeder) for 10 sec before this slurry is injected into the reactor at stirring speed of 150 rpm with 100 g propylene. After increasing the stirring speed to 350 rpm the internal temperature of the reactor is raised to the desired polymerisation temperature of 70° C. within about 15 minutes. The polymerisation time is counted to start from the moment when the internal temperature of 68° C. is reached after which the polymerisation is allowed to proceed for 30 minutes. The polymerisation is stopped by flashing the monomer and cooling down the reactor. The reactor is purged with nitrogen before discharging the polymer. A small part of the polymer has been dried in a hood over night and additionally in a vacuum oven for 3 hours at 60° C. for analysis of butene-1 content. The main part has been dried over night in a hood at room temperature. Weight of total polymer was 1405 g. The catalyst activity was 7.1 [kg/(gcat*h)].

1400 g of E 1 has been compounded with Irganox 1010 FF (0.2 wt.-%), Ca-stearate (0.07 wt.-%), Irgafos 168 FF (0.1 wt.-%), Irganox 1330 (0.5 wt.-%) and EMB250 grey 7042 from Mastertec GmbH (masterbatch with β-nucleating agent) (2.0 wt.-%) using a 2-screw extruder Prism TSE16. EMB250 grey 7042 contains the following compounds:

49.2 wt.-% RE 216 CF (CAS-no 9010-79-1) [random copolymer of Borealis]
47.0 wt.-% P. White 7 (CAS-no 1314-98-3)
0.5 wt.-% P. Black 7 (CAS-no 1333-86-4)
2.0 wt.-% P. Green 17 (CAS-no 1308-38-9)
1.3 wt.-% P. Blue 28 (CAS-no 1345-16-0)
0.25 wt.-% P. Orange 48 (CAS-no 1503-48-6)

This granulate has been used for characterisation (except for butene-1 content) and in sample preparation for mechanical testing (DMTA, flexural properties, impact properties and FNCT-test).

Inventive Example 2 (E 2)

The polymerisation procedure and testing of material is done as in Example 1, but with following changes of parameters in polymerisation:

Amount of 1-butene: 120 g
Amount of Propylene ($1^{st}$ filling step of reactor): 3500 g
Amount of $H_2$: 10 mmol
Amount of catalyst: 356 mg The yield of polymer was 1440 g, the catalyst activity 8.1 [kgPP/(gcat*h)].

Comparative Example 1 (CE1)

In CE1, a beta-nucleated propylene homopolymer in combination with a propylene/butene copolymer (C4 comonomer content: 4.3 wt %) was used. The composition was prepared using a Ziegler-Natta catalyst.

TABLE 1

Polymerisation parameters and results for CE 1

| Product name | | CE 1 |
|---|---|---|
| Catalyst type | | BCF20P |
| Donor type | | D |
| Al/Ti ratio | [mol/mol] | 200 |
| Al/donor ratio | [mol/mol] | 10 |
| LOOP | | |
| Temperature | [° C.] | 85 |
| H2/C3 ratio | [mol/kmol] | 0.12 |
| C4/C3 ratio | [mol/kmol] | 151.5 |
| Split | [%] | 100 |
| MFR$_2$ | [g/10 min] | 0.22 |
| XS | [%] | 2.6 |
| C4 content | [wt.-%] | 4.3 |
| CaSt | [ppm] | 700 |
| Irganox B215 | [ppm] | |
| Irganox 1330 | [ppm] | 5000 |
| Irgafos 168 | [ppm] | 1000 |
| Irganox 1010 | [ppm] | 2000 |
| EMB250 grey 7042 | [ppm] | 20000 |

D: dicyclopentyldimethoxysilane
C4: butene-1
C3: propylene
H2: hydrogen
CaSt: Ca-stearate The properties of the polypropylenes obtained from E1, E2 and CE1 are shown in Table 2.

TABLE 2

Properties of the polypropylene materials

| Example | Unit | CE1 | E1 | E2 |
|---|---|---|---|---|
| dosing C4 | [w%] | >7 | 1.2 | 1.6 |
| content C4 | [w%] | 4.3 | 1 | 1.4 |
| MFR$_2$ | [g/10 min] | 0.26 | 0.33 | 0.26 |
| intr. visc. | [ml/g] | 397 | 335 | 363 |
| Tm2 | [° C.] | 142.5 | 140.1 | 137.3 |
| Tm3 | [° C.] | 155.9 | 151 | 148.1 |
| Hm2 | [J/g] | 79.4 | 78 | 72.7 |
| Hm3 | [J/g] | 14.5 | 12.7 | 13.6 |
| β | [%] | 84.56 | 86.00 | 84.24 |
| cristallinity | [%] | 44.93 | 43.40 | 41.29 |
| XCS | [wt.-%] | 2.68 | 0.96 | 0.92 |
| Peak's tan_d | [° C.] | 1.7 | 3 | 2.5 |
| Peak's tan_d | [° C.] | 87.8 | 78.5 | 76.5 |
| Peak's tan_d | [° C.] | 137.8 | 135.8 | 134.5 |
| G' (23° C.) | [MPa] | 641 | 666 | 636 |
| wc | [rad/s] | 2.05 | 4.68 | 3.44 |
| PI | [Pa-1] | 3.55 | 2.42 | 2.44 |
| SHI0/50 | | 8.18 | 8.08 | 10.57 |
| FLEX. MOD. | [MPa] | 1161.5 | 1230 | 1224.5 |
| FLEX. STRENGTH | [MPa] | 33 | 34.6 | 34.6 |
| FLEX. STRAIN AT FLEX. STRENGTH | % | 7.3 | 7.2 | 7.2 |
| FLEXURAL STRESS AT 3.5% STRAIN | [MPa] | 26.5 | 28.1 | 28.1 |
| IMPACT STRENGTH 23° C. | [kJ/m$^2$] | 72.8 | 53.8 | 60 |
| TYPE OF FAILURE | | None | Part. br. | Part. br. |
| IMPACT STRENGTH 0° C. | [kJ/m$^2$] | 5.1 | 4.7 | 4.8 |

TABLE 2-continued

Properties of the polypropylene materials

| Example | Unit | CE1 | E1 | E2 |
|---|---|---|---|---|
| TYPE OF FAILURE | | 0 | Complete br. | Complete br. | Complete br. |
| IMPACT STRENGTH −20° C. | [kJ/m$^2$] | 2.7 | 2.7 | 2.8 |
| TYPE OF FAILURE | | None | Compl. br. | Compl. br. | Compl. br. |
| FNCT/1 | h | 793 | 1396 | 3357 |
| FNCT/2 | h | 876 | 1572 | 2049 |
| FNCT/3 | h | 887 | 1733 | 2490 |

Flexural and impact properties have been measured at bars with dimension 4*10*80 [mm] which are injection moulded using a machine Engel V60 Tech with a 22 mm screw at 255° C. at a pressure of 50 bar and post-pressure of 55 bar. The testing is done after 7 days storage at 23° C.

Bars for FNCT test are made by a slab press using a metal form of dimensions 12*~20*120 [mm] which is filled with granulate. The machine is a Collin press P400. The pressure/temperature/time profile of the pressing action is as follows:

| Time | [min] | 12 | 1 | 1 | 10 | 12 |
|---|---|---|---|---|---|---|
| Temperature | [° C.] | 220 | 220 | 220 | 30 | 20 |
| Pressure | [bar] | 0 | 5 | 5 | 6 | 15 |

The specimens are cut after the forming procedure to the accurate dimension for testing, which has been done at the HESSEL Ingenieurtechnik GmbH.

We claim:

1. Propylene copolymer (A)
  (a) comprising at least 1-butene as a comonomer;
  (b) having a comonomer content in the range of 1.0 to 3.0 wt.-%;
  (c) having a xylene cold soluble fraction (XCS) equal or below 2.5 wt.-%;
  (d) being partially crystallized in the β-modification; and
  (e) comprising a β-nucleating agent (B);
  wherein the part of the copolymer (A) crystallized
  (ii) in the α-modification has a melting temperature below 152° C. and/or
  (iii) in the β-modification has a melting temperature below 141° C.

2. Propylene copolymer according to claim 1, wherein the propylene copolymer (A) fulfills the equation (1.1)

$$\frac{[XCS]}{[C]} < 1.0 \qquad (I.1)$$

wherein
  [XCS] is the amount of xylene cold soluble fraction (XCS) of the propylene copolymer (A) given in weight percent and
  [C] is the amount of comonomer of the propylene copolymer (A) in weight percent.

3. Propylene copolymer according to claim 1, wherein the propylene copolymer (A) has polydispersity index (PI) of equal or below 4.0 Pa$^{-1}$.

4. Propylene copolymer (A) according to claim 1, wherein propylene copolymer (A) has a MFR$_2$ (230° C.) of not more than 0.8 g/10 min measured according to ISO 1133.

5. Propylene copolymer (A) according to claim 1, wherein the 1-butene content of the propylene copolymer (A) is in the range of 1.0 to 2.0 wt.-%.

6. Propylene copolymer (A) according to claim 1, wherein the propylene copolymer (A) is only constituted by propylene and 1-butene units.

7. Propylene copolymer (A) according to claim 1, wherein the comonomer content of the propylene copolymer (A) is in the range of 1.0 to 2.0 wt.-%.

8. Propylene copolymer (A) according to claim 1, wherein the amount of the β-modification of the propylene copolymer (A) is at least 50%.

9. Propylene copolymer (A) according to claim 1, wherein the propylene copolymer (A) has a flexural modulus measured according to ISO 178 of at least 1000 MPa.

10. Propylene copolymer (A) according to claim 1, wherein the propylene copolymer (A) has an impact strength measured according the Charpy impact test (ISO 179 (1eA)) at 23° C. of at least 50.0 kJ/m$^2$ and/or an impact strength measured according the Charpy impact test (ISO 179 (1eA)) at −20° C. of at least 2.0 kJ/m$^2$.

11. Propylene copolymer according to claim 1, wherein the propylene copolymer (A) has a full notch creep test (FNCT) measured according to ISO 16770 (at 80° C. and applied stress of 4.0 MPa) of more than 1200 h.

12. Propylene copolymer (A) according to claim 1, which is formed into pipes or parts of pipes.

13. Process for the manufacture of a propylene copolymer (A), comprising producing the propylene polymer (A) in the presence of a metallocene catalyst and adding β-nucleated agent, and
wherein the propylene copolymer (A)
(a) comprises at least 1-butene as a comonomer;
(b) has a comonomer content in the range of 1.0 to 3.0 wt.-%;
(c) has a xylene cold soluble fraction (XCS) equal or below 2.5 wt.-%;
(d) is partially crystallized in the β-modification; and;
(e) comprises a β-nucleating agent (B);
wherein the part of the copolymer (A) crystallized
(ii) in the α-modification has a melting temperature below 152° C. and/or
(iii) in the β-modification has a melting temperature below 141° C.

14. Pipe comprising a propylene copolymer (A)
(a) comprising at least 1-butene as a comonomer;
(b) having a comonomer content in the range of 1.0 to 3.0 wt.-%;
(c) having a xylene cold soluble fraction (XCS) equal or below 2.5 wt.-%;
(d) being partially crystallized in the β-modification; and;
(e) comprising a β-nucleating agent (B);
wherein the part of the copolymer (A) crystallized
(ii) in the α-modification has a melting temperature below 152° C. and/or
(iii) in the β-modification has a melting temperature below 141° C.

15. Pipe according to claim 14, wherein the pipe is a pressure pipe.

* * * * *

UNITED STATES PATENT AND TRADEMARK OFFICE
CERTIFICATE OF CORRECTION

PATENT NO. : 8,637,625 B2
APPLICATION NO. : 12/998676
DATED : January 28, 2014
INVENTOR(S) : Klaus Bernreitner et al.

Page 1 of 1

It is certified that error appears in the above-identified patent and that said Letters Patent is hereby corrected as shown below:

In the Specification

Column 18, Line 49, "solved" should be --dissolved--

Column 20, Line 65, "to" should be --too--

Column 21, Line 45, "rector" should be --reactor--

Column 21, Line 47, "rector" should be --reactor--

Column 24, Line 10, "$cm^1$" should be --$cm^{-1}$--

Column 24, Line 55, "f" should be --f'--

Column 25, Line 45, "$cm^1$" should be --$cm^{-1}$--

Column 25, Line 46, "$cm^1$" should be --$cm^{-1}$--

Column 25, Line 48, "$cm^1$" should be --$cm^{-1}$--

Column 25, Line 49, "$cm^1$" should be --$cm^{-1}$--

Signed and Sealed this
Second Day of September, 2014

Michelle K. Lee
*Deputy Director of the United States Patent and Trademark Office*